United States Patent [19]
Kalchauer et al.

[11] Patent Number: 5,166,287
[45] Date of Patent: Nov. 24, 1992

[54] PROCESS FOR THE PREPARATION OF ORGANOPOLYSILANES

[75] Inventors: Wilfried Kalchauer; Bernd Pachaly; Lutz Roesch, all of Burghausen, Fed. Rep. of Germany

[73] Assignee: Wacker-Chemie GmbH, Munich, Fed. Rep. of Germany

[21] Appl. No.: 721,073

[22] Filed: Jun. 26, 1991

[30] Foreign Application Priority Data

Jun. 29, 1990 [DE] Fed. Rep. of Germany ....... 4020828

[51] Int. Cl.$^5$ ............................................. C08G 77/06
[52] U.S. Cl. ...................................... 528/14; 528/32; 528/33; 556/430; 525/474
[58] Field of Search ...................... 528/14, 31, 32, 33; 556/430; 525/474

[56] References Cited

U.S. PATENT DOCUMENTS

| Re. 31,447 | 11/1983 | Baney et al. | 264/65 |
| 4,667,046 | 5/1987 | Frey et al. | 556/430 |
| 4,783,516 | 11/1988 | Schilling et al. | 528/14 |
| 4,841,083 | 6/1989 | Nagai et al. | 528/14 |
| 4,889,904 | 12/1989 | Burns | 528/25 |
| 4,952,658 | 8/1990 | Kalchauer et al. | 556/430 |

Primary Examiner—Melvyn I. Marquis
Assistant Examiner—Margaret W. Glass

[57] ABSTRACT

A process for the preparation of organopolysilanes which comprises reacting at least one disilane of the general formula $$R_k R^3{}_m Si_2 (OR^1)_{6-k-m} \quad (I)$$

in which the radicals R may be the same or different and are hydrogen atoms or monovalent, saturated organic radicals, the radicals $R^3$ may be the same or different and are monovalent, unsaturated organic radicals, the radicals $R^1$ may be the same or different and are monovalent alkyl groups, k is 0, 1, 2 or 3, and m is 1, 2, 3 or 4, in which the sum of k and m is less than or equal to 4, and optionally mixed with a disilane of the formula $$R_n Si_2 (OR^1)_{6-n} \quad (II)$$

in which R and $R^1$ are the same as above and n is 0, 1, 2 or 3, in the presence of at least one compound of the general formula $$MOR^2 \quad (III)$$

in which $R^2$ is a monovalent hydrocarbon radical and M is an alkali metal atom.

8 Claims, No Drawings

PROCESS FOR THE PREPARATION OF ORGANOPOLYSILANES

The invention relates to a process for the preparation of organopolysilanes, and to their use.

BACKGROUND OF THE INVENTION

Processes for the preparation of organopolysilanes have already been disclosed in, for example, W. H. Atwell and D. R. Weyenberg, J. Am. Chem. Sec. 90 (1968) 3438, in which organopoly-silanes have been prepared from dimethoxytetramethyldisilane However, this process only gives organopolysilanes of low chain length. U.S. Pat. No. Re. 31,447 (Baney et al., Dow Corning Corp.; published on Nov. 22, 1983) discloses a two-step process for preparing organopolysilanes containing SiOC-bonded methoxy groups. U.S. Pat. No. 4,667,046 (B. Pachaly, Wacker-Chemie GmbH; published on May 19, 1987) discloses a process for preparing organopoly-silanes in which the reaction mixture contains trimethoxydisilane, an alkali metal compound and at least one organosilane containing an Si-bonded hydrogen atom. Furthermore, U.S. Pat. No. 4,889,904 (G. Burns, Dow Corning Corp.; published on Dec. 26, 1989) describes a process for preparing a methylpolysilane in which the reaction mixture contains alkoxyfunctional disilanes and alkoxy-functional silanes having at least one unsaturated substituent.

Therefore, it is an object of the present invention to provide a simple process for the preparation of organopolysilanes.

SUMMARY OF THE INVENTION

The foregoing object and others which will become apparent from the following description are accomplished in accordance with this invention, generally speaking by providing a process for preparing organopolysilanes, which comprises reacting at least one disilane of the general formula $$R_k R^3{}_m Si_2(OR^1)_{6-k-m} \qquad (I)$$

in which the radicals R may be the same or different and are hydrogen atoms or monovalent, saturated organic radicals, the radicals $R^3$ may be the same or different and are monovalent, unsaturated organic radicals, the radicals $R^1$ may be the same or different and are monovalent alkyl groups, k is 0, 1, 2 or 3, and m is 1, 2, 3 or 4, in which the sum of k and m is less than or equal to 4, and if desired mixed with a compound of the formula $$R_n Si_2(OR^1)_{6-n} \qquad (II)$$

in which R and $R^1$ are the same as above and n is 0, 1, 2 or 3, in the presence of at least one compound of the general formula $$MOR^2 \qquad (III)$$

in which $R^2$ is a monovalent hydrocarbon radical and M is an alkali metal atom.

DESCRIPTION OF THE INVENTION

The radical R is preferably a hydrogen atom or a saturated hydrocarbon radical having from 1 to 12 carbon atoms.

Examples of radicals represented by R are alkyl radicals, such as the methyl, ethyl, n-propyl, isopropyl, n-butyl, isobutyl, tert-butyl, n-pentyl, isopentyl, neopentyl and tert-pentyl radicals, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, cycloalkyl radicals, such as cyclopentyl, cyclohexyl and cycloheptyl radicals, and methylcyclohexyl radicals The radical R is preferably a methyl or ethyl radical, and more preferably a methyl radical.

The radical $R^3$ is preferably an unsaturated hydrocarbon radical having from 1 to 12 carbon atoms.

Examples of radicals represented by R3 are alkenyl radicals, such as the vinyl and allyl radicals; aryl radicals, such as the phenyl and naphthyl radicals; alkaryl radicals, such as o-, m- and p-tolyl radicals, xylyl radicals and ethylphenyl radicals, and aralkyl radicals, such as the benzyl radical and the α- and β-phenylethyl radicals.

The radical $R^3$ is preferably the vinyl, allyl, phenyl or naphthyl radical, and more preferably the vinyl or phenyl radical.

The radical represented by $R^1$ is preferably an alkyl group having from 1 to 4 carbon atoms, more preferably the methyl or ethyl radical, and in particular the methyl radical.

Examples of radicals represented by $R^1$ are the same examples mentioned for R, where R is an alkyl radical having from 1 to 4 carbon atoms, k is preferably 2 or 3, and more preferably 2, m is preferably 1, 2 or 3, and more preferably 1 or 2. The sum of k and m is preferably 3 or 4 and n is preferably 2 or 3.

Examples of disilanes of formula (I) which are employed in the process of this invention are 1,1,2-trimethyl-1,2,-dimethoxyphenyldisilane, 1,1,2-trimethyl-1,2-dimethoxyvinyldisilane, 1,1,2-trimethyl-1,2-diethoxyphenyldisilane, 1,1,2-trimethyl-1,2-diethoxyvinyldisilane, 1-phenyl-1,2-dimethyltrimethoxydisilane, 1-phenyl-1,2-dimethyltriethoxydisilane, 1-vinyl-1,2-dimethyltrimethoxydisilane, 1-vinyl-1,2-dimethyltriethoxydisilane, 1,2-dimethyl-1,2-dimethoxydiphenyldisilane, 1,2-dimethyl-1,2-dimethoxydivinyldisilane, 1,2-dimethyl-1,2-diethoxydiphenyldisilane, 1,2-dimethyl-1,2-diethoxydivinyldisilane, 1,1,2,2-tetraphenyldimethoxydisilane, 1,1,2,2-tetravinyldimethoxydisilane, 1,1,2,2-tetraphenyldiethoxydisilane, 1,1,2,2-tetravinyldiethoxydisilane, 1,2-dimethyl-1,1,2-trimethoxynaphthyldisilane, 1,2-dimethyl-1,1,2-triethoxynaphthyldisilane, 1,2-dimethyl-1,2-dimethoxydinaphthyldisilane and 1,2-dimethyl-1,2-diethoxydinaththyldisilane.

The disilane of formula (I) employed in the process of this invention is preferably 1-phenyl-1,2-dimethyltrimethoxydisilane, 1-phenyl-1,2-dimethyltriethoxydisilane, 1-vinyl-1,2-dimethyltrimethoxydisilane, 1-vinyl-1,2-dimethyltriethoxydisilane, 1,2-dimethyl-1,2-dimethoxydiphenyldisilane, 1,2-dimethyl-1,2-dimethoxydivinyldisilane, 1,2-dimethyl-1,2-diethoxydiphenyldisilane or 1,2-dimethyl-1,2-diethoxydivinyldisilane, particular preference being given to 1-phenyl-1,2-dimethyltrimethoxydisilane, 1-vinyl-1,2-dimethyltrimethoxydisilane, 1,2-dimethyl-1,2-dimethoxydiphenyldisilane and 1,2-dimethyl-1,2-dimethoxydivinyldisilane.

Examples of disilanes of formula (II) employed in the process of this invention are 1,1,2-trimethyltrimethoxydisilane, 1,1,2-trimethyltriethoxydisilane, 1,1,2-triethyltrimethoxydisilane, 1,1,2-triethyltriethoxydisilane, 1,2-dimethyltetramethoxydisilane, 1,2-dimethyltetraethoxydisilane, methyl-pentamethoxydisilane, methylpentaethoxydisilane, methylpentaisopropoxydisilane, hexamethoxydisilane, hexaethoxydisilane and hexaisopropoxydisilane.

The disilane of formula (II) employed in the process of this invention is preferably 1,1,2-trimethyltrimethoxydisilane, 1,1,2-trimethyltriethoxydisilane, 1,2-dimethyltetramethoxydisilane or 1,2-dimethyltetraethoxydisilane.

The disilane of formula (I) or of formula (II) employed in the process of this invention may in each case be a single type of such a disilane or a mixture of at least two different types of such disilanes.

A preferred embodiment of the process of this invention is carried out in the presence of a disilane of formula (II).

The disilane of formula (II) employed in the process of this invention is preferably a mixture of a disilane of the formula

$$R_3Si_2(OR^1)_3 \qquad (IV)$$

and a disilane of the formula

$$R_2Si_2(OR^1)_4 \qquad (V)$$

in which R and $R^1$ are the same as above, in which the molar ratio between the disilane of formula (IV) and the disilane of formula (V) in the mixture is preferably between 30:70 and 90:10, and more preferably between 40:60 and 80:20.

The preparation of disilanes is generally known. Reference is made here, for example, to E. Hengge et al., Monatshefte fur Chemie 105 (1974) 671-83 and 99 (1968) 340-6, and to W. H. Atwell et al., J. Organomet. Chem. 7 (1967) 71-8 and H. Watanabe et al., J. Organomet. Chem. 128 (1977) 173-5.

In the process of this invention, the disilane of formula (II) is preferably employed in an amount of from 100 to 3000 percent by weight, and more preferably from 500 to 2000 percent by weight, based on the weight of the disilane of formula (I) employed.

The radical $R^2$ is preferably a hydrocarbon radical having from 1 to 12 carbon atoms.

Examples of radicals represented by $R^2$ are the same examples as mentioned for the radicals R and R3, except for the hydrogen atoms.

The radical $R^2$ is preferably the methyl, ethyl or tert-butyl radical, and more preferably the methyl or tert-butyl radical.

M in formula (III) is preferably lithium, sodium, potassium, rubidium or cesium, and more preferably sodium or potassium.

Examples of compounds of formula (III) which are employed in the process of this invention as catalysts are sodium methoxide, sodium ethoxide, sodium tert-butoxide, potassium tert-butoxide and potassium methoxide.

In the process of this invention, the catalyst employed is preferably sodium methoxide, sodium ethoxide, sodium tert-butoxide or potassium tert-butoxide, and more preferably sodium methoxide or potassium tert-butoxide.

In the process of this invention, the catalyst is preferably employed in an amount of from 0.03 to 2.50 percent by weight, and more preferably from 0.05 to 0.80 percent by weight, based on the total weight of the disilane employed.

The catalysts employed in the process of this invention may be a single type of such catalyst or a mixture of at least two different types of such catalysts.

In the process of this invention, the reaction is preferably carried out under an inert atmosphere, such as, for example, under an argon, helium or nitrogen atmosphere, and, after the reactants and catalysts have been mixed, preferably at a temperature between 20° and 250° C. and more preferably between 40° and 210° .C, and at a pressure preferably between 900 and 1100 hPa. If desired, however, higher or lower pressures can be used, lower pressures being preferred if the reaction mixture contains disilanes containing vinyl and/or allyl groups. In the process of this invention, the volatile constituents, such as, for example, monomeric silanes, are preferably removed from the reaction mixture by distillation during or after, and more preferably during the reaction.

In the process of this invention, organopolysilanes having an average of 8 to 30 silicon atoms and having an average molecular weight of between 1000 and 2000 are preferably obtained, the molecular weight distribution being substantially monomodal and symmetric.

The process of this invention has the advantage that it can be carried out relatively easy in one step and organopolysilanes which are free from Si-bonded halogen atoms are obtained.

The process of this invention has the additional advantage that functional groups, such as, for example, phenyl, vinyl and allyl groups, or additional branching points can be specifically incorporated into the organopolysilane in a simple manner, which allows for the chemical and physical properties of the organo-polysilane to be controlled within broad limits.

The organopolysilanes prepared by this invention can be employed for all the purposes for which it was also possible to employ organopolysilanes prepared heretofore.

The organopolysilanes prepared by this invention are preferably used in processes for the production of silicon carbide (SiC) fibers.

SiC fibers and processes for their production are widely known. SiC fibers are predominantly produced from polysilanes or polycarbosilanes. All these processes have the common feature of spinning a suitable polymer with subsequent crosslinking and pyrolysis under an inert gas or in vacuo.

In a preferred process for the production of SiC fibers, organopolysilanes prepared according to this invention are spun to form fibers and reacted under an inert atmosphere or in vacuo at temperatures in the range from 800° to 1400° C.

Preferred temperatures are in the range from 1000° to 1300° C. and preferred inert gases are argon and nitrogen.

The spinning to give fibers is carried out by known processes, such as dry spinning, wet spinning or melt spinning, but preferably by melt spinning. In this process, fibers preferably having a mean diameter of from 10 to 50 μm are spun from the melt and crosslinked by exposure to heat, light, such as, for example, UV light, steam and/or oxygen, but in particular air. The crosslinked fibers can be drawn under an inert gas or in air at temperatures of from 50° to 400° C.

From 0 to 30 percent by weight, preferably from 1 to 10 percent by weight, based on the weight of the organopolysilane employed, of a compound of the general formula $$R^5O[(R^5O)_2TiO]_pTi(OR^5)_3 \quad , (VI)$$

in which the $R^5$ radicals may be the same or different and are monovalent alkyl radicals, and p is within the limits from 0 to 1000, preferably from 50 to 500, can be added to the organopolysilanes prepared according to this invention in the process for the production of SiC fibers.

Examples of radicals represented by $R^5$ are the same examples mentioned for the R radical when R is an alkyl radical. The radical $R^5$ is preferably the n-propyl or n-butyl radical.

The preparation of the compounds of the general formula (VI) is known and is described, for example, in D. C. Bradle, R. C. Mehrotra and D. P. Gaur, Metal Alkoxides, Academic Press Inc., London, 1978.

The addition of the compounds of the general formula (VI) is preferably carried out by dissolving the organopolysilane prepared according to this invention in an organic solvent, adding the compound of the general formula (VI) and removing the solvent again.

Preferred solvents are aromatic or aliphatic hydrocarbons, such as toluene, xylene, benzene and petroleum ethers of various boiling fractions, in amounts of, preferably, from 50 to 300 percent by weight, and more preferably from 70 to 150 percent by weight, based on the weight of the organopolysilane employed.

The solvent is preferably removed at a temperature between 80 and 250° C, and at a pressure in the range from 10 to 1000 Pa.

SiC fibers are principally used in fiber-composite materials, preferably in fiber-composite materials whose matrix comprises a ceramic, such as SiC or $Si_3N_4$, glass or a metal, such as, for example, aluminum or titanium.

The organopolysilanes of this invention are also employed in processes for the preparation of silicon carbide (SiC) or SiC ceramics by heating the organopolysilanes prepared according to this invention to temperatures above 600.C under inert atmospheres, such as, for example, under argon, helium or nitrogen atmospheres, or in vacuo.

In a preferred process for the preparation of porous SiC ceramics, organopolysilanes prepared according to this invention are mixed with SiC powders, pressed to form a molded article and reacted under an inert atmosphere or in vacuo at a temperature in the range of from 700° to 2200° C.

Preferred temperatures are in the range of from 900° to 1500° C. and preferred SiC powders have a mean particle size of from 0.1 to and more preferably from 50 to 80 percent by weight, based on the weight of the organopolysilane employed, of SiC powder.

Pressing assistants, in particular flow aids, in amounts of from 0.01 to 5 percent by weight and more preferably from 0.2 to 1 percent by weight, based on the weight of SiC powder employed, are preferably added to the mixture comprising organopolysilane and SiC powder. Flow aids are described, for example, in Aldinger, Kalz; Angew. Chemie 5, 381, 1987. In particular, glycerol, ammonium stearate or a polyethylene glycol is used.

The mixing of the organopolysilane of this invention with the SiC powder and, if used, with the pressing assistant is preferably carried out by dissolving the organopolysilane in an organic solvent and mixing the solution with the additional components. Preferred solvents are aromatic or aliphatic hydrocarbons, such as toluene, xylene or petroleum ethers of various boiling fractions, in amounts of, preferably, from 10 to 99 percent by weight, and more preferably from 35 to 55 percent by weight, based on the mixture.

The solvent is subsequently removed, preferably at a temperature of from 50° to 200° C. and at a pressure of from 10 to 1000 Pa. The residue which remains is comminuted and screened. The powder obtained in this manner preferably having a maximum particle size of 500 μm, and more preferably 200 μm, is pressed with a press to form a molded article, if desired at elevated temperature. This can be carried out under an inert atmosphere, air or in vacuo.

The porous silicon ceramics of this invention are employed, in particular, in filtration technology. By lowering the particle sizes and the particle size distribution of the SiC powders employed and also the SiC powders to organopolysilane ratio, the pore sizes and pore size distribution in the ceramics can be adjusted. One of the advantages of SiC filter plates is that organic filtration residues can easily be removed by oxidation without simultaneously destroying the ceramic filter.

In addition, the organopolysilanes prepared according to this invention can be employed in processes for the production of protective coatings based on silicon carbide. These coatings on metallic and nonmetallic surfaces are thermally and chemically stable.

In a preferred process for the production of protective coatings based on silicon carbide, organopolysilanes prepared according to this invention, preferably mixed with SiC powder and an organic solvent, are applied to the substrate to be protected and are reacted under an inert atmosphere, such as, for example, under an argon or nitrogen atmosphere, or in vacuo, at temperatures in the range from 700° to 1500° C., or under a reactive atmosphere, such as, for example, in an oxygen-containing gas mixture, at temperatures of from 200° to 700° C. Particular preference is given to mixtures comprising from 10 to 80 percent by weight, preferably from 15 to 40 percent by weight, of organopolysilane prepared according to the invention, from 10 to 80 percent by weight, preferably from 20 to 50 percent by weight, of an SiC powder having a mean particle size distribution of from 0.1 to 20 μm, preferably from 0.3 to 5 μm, and from 10 to 80 percent by weight, preferably from 15 to 60 percent by weight, of an organic solvent, such as aliphatic and aromatic hydrocarbons, preferably toluene, xylene and petroleum ethers of various boiling fractions.

The application of the coating can be carried out in any manner suitable for the application of liquid or pasty substances to substrates, for example by dipping, spraying, spreading, pouring or rolling.

After application, the coating is preferably dried for from 15 minutes to 2 hours at temperatures of, preferably, from 10° to 200° C. under an inert or reactive atmosphere The protective coatings produced according to this invention preferably have a thickness of 2-2000 μm, in particular 2-50 μm. They are used, in particular, to produce thermally and chemically resistant surface coatings on metals, ceramics, glass ceramics, fiber materials and carbon.

The organopolysilanes of this invention can also be employed in the production of negative photoresist coatings, for example in the manufacture of circuit boards and semiconductor components in a manner known per se for the production of negative photoresist coatings of organopolysilanes In this application, an organopolysilane prepared according to this invention is applied to a suitable smooth or planar substrate, such as a semiconductor chip, the coating is exposed through a mask, and the unexposed areas of the organopolysilane coating are separated from the exposed, crosslinked areas using a solvent, such as toluene.

In the examples described below, all parts and percentages are by weight, unless otherwise specified. Unless stated otherwise, the examples below are carried out at the pressure of the ambient atmosphere, i.e., at about 1000 hPa, and at room temperature, i.e., at about 23° C., or at the temperature prevailing on combination of the reactants at room temperature without additional heating or cooling.

The reactions described under (I), (II) and (III) and in Examples 1 to 4 are carried out under an argon atmosphere and at a pressure of about 1000 hPa.

The weight average molecular weight $M_w$ and the number average molecular weight $M_n$ are determined from the corresponding GPC chromatograms using a polystyrene standard.

Hereinafter, the abbreviations have the following meanings:
Me=methyl,
Ph=phenyl and
Vi=vinyl.

(I) Preparation of 1,1,2-trimethyl-1,2-dimethoxyphenyldisilane

About 24.1 g of magnesium turnings, 5 ml of dry tetrahydrofuran and 5 ml of bromobenzene are introduced into a flask fitted with reflux condenser. About 150 g of bromobenzene in 125 ml of tetrahydrofuran are subsequently added dropwise at such a rate that the reaction mixture refluxes without external supply of heat. When the reaction is complete, the magnesium is fully consumed and the resultant Grignard compound is filtered.

About 194 g of 1,1,2-trimethyltrimethoxydisilane (97%) and 200 ml of toluene are introduced into a flask, cooled to from 6° to 10° C. and treated slowly with the Grignard compound obtained above. The precipitated magnesium salts are subsequently filtered off, and the liquid reaction residue is shaken with hexane and filtered again. Distillation is carried out at from 77° to 100° C. and at a pressure of 100 Pa, giving 75 g of 1,1,2-trimethyl-1,2-dimethoxyphenyldisilane.

(II) Preparation of 1,2-dimethyl-1,2-dimethoxydiphenyldisilane About 105 g of 1,2-dimethyltetramethoxydisilane and 100 g cf toluene are introduced into a flask, and the Grignard compound obtained in (I) above is added at room temperature over a period of about 4 hours. The mixture is subsequently stirred for an additional 16 hours. The solvent is removed by distillation, and the residue is taken up in 600 ml of petroleum ether with a boiling range of 170°-200° C., and the solution is filtered. The petroleum ether is subsequently stripped off in vacuo at 120.C, and 175 g of 1,2-dimethyl-1, 2-dimethoxydiphenyl-disilane crystallized out of the remaining residue.

(III) Preparation of 1,2-dimethyl-1,2-dimethoxydivinyldisilane About 105 g of 1,2-dimethyltetramethoxydisilane and 250 ml of tetrahydrofuran are introduced into a flask, and 620 ml of vinyl Grignard compound (15% commercially available from Chemetall) are added slowly at a temperature of from 15° to 20° C. The mixture is subsequently stirred for 16 hours. The tetrahydrofuran is removed by distillation at 30° C. and a pressure of 120 hPa, the residue is taken up in 1 liter of hexane and the solution is filtered. The solvent is removed by distillation at from 85° to 100° C. and at a pressure of 36 Pa, giving 1,2-dimethyl-1,2-dimethoxydivinyldisilane, which is still contaminated with 1,2-dimethyltetramethoxydisilane and 1,2-dimethyl-1,1,2-trimethoxyvinyldisilane.

EXAMPLE 1

(A) About 1 g of sodium methoxide is added to a mixture containing 650 g of 1,1,2-trimethyltrimethoxydisilane, 350 g of 1,2-dimethyltetramethoxydisilane and 41 g of 1,2-dimethyl-1,2-dimethoxydiphenyldisilane at 23° C., and the mixture is warmed, without external supply of heat, to 96° C. The mixture is subsequently warmed to 210° C.,during which 758 g of a mixture of methyltrimethoxysilane and dimethyldimethoxysilane distil off. About 292 g of residue are obtained, which are dissolved in 300 g of petroleum either having a boiling range of from 170° to 200° C. in order to remove the undesired oligomers. The solvent and oligomers are subsequently removed by distillation at 230° C. and 10 Pa. The 263 g of residue obtained in this manner represents an organopolysilane of the average formula

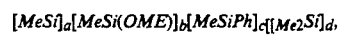

where, in each case, a is an average of 8.9, b is an average of 2.7, c is an average of 0.8 and d is an average of 9.0, the molar methyl group to methoxy group to phenyl group ratio is from 100:9.0:3.0, the number average molecular weight $M_n$ to weight average molecular weight $M_w$ ratio is 1000:4500, and the softening point is 70° C.

The reactions shown in Table 1 are carried out analogously to the above mentioned procedure, with the data under the column headings having the following meanings:
A=the number of the experiment
B=the amount of 1,1,2-trimethyltrimethoxydisilane in g
C=the amount of 1,2-dimethyltetramethoxydisilane in g
D=the amount of 1,2-dimethyl-1,2-dimethoxydiphenyldisilane in g
E=the amount of distillate in g
F=the amount of organopolysilane obtained in g
G=the $m_n M_w$ value
H=the softening point in C and
I=the molar methyl group to methoxy group to phenyl group ratio.

TABLE 1

| A | B | C | D | E | F | G | H | I |
|---|---|---|---|---|---|---|---|---|
| 1.2 | 600 | 400 | 41 | 785 | 255 | 900/2200 | 130 | 100:4.8:3.1 |
| 1.3 | 610 | 390 | 83 | 802 | 292 | 970/2250 | 110 | 100:5.8:4.8 |
| 1.4 | 600 | 400 | 124 | 827 | 308 | 930/1850 | 80 | 100:5.4:6.3 |
| 1.5 | 600 | 400 | 166 | 837 | 350 | 1250/2500 | 85 | 100:6.1:7.9 |
| 1.6 | 510 | 490 | 83 | 837 | 250 | 950/1950 | 175 | 100:5.6:4.8 |

(B) About 25 g of poly-n-butyl titanate (commercially available from Johnson Matthey GmbH, Alfa Products) are added to a solution of the resultant organopolysilane in petroleum ether having a boiling range of from 170°-200° C., and the mixture is stirred at 130° C. for one hour. The solvent and oligomers are subsequently removed by distillation at 230° C. and 10 Pa. A grey-blue resin is obtained. The data for this reaction are given in Table 2, where K=the amount of organopolysilane employed in g
L=the amount of petroleum ether in g
M=the $M_n/M_w$ value
N=the softening point in °C. and
O=the molar methyl group to methoxy group to phenyl group ratio.

TABLE 2

| A | K | L | M | N | O |
| --- | --- | --- | --- | --- | --- |
| 1.1 | 270 | 300 | 925/4000 | 70 | 100:8.7:3.0 |
| 1.2 | 270 | 300 | 870/1920 | 130 | 100:4.4:3.1 |
| 1.3 | 270 | 300 | 920/1940 | 110 | 100:5.3:4.7 |
| 1.4 | 270 | 300 | 870/1600 | 80 | 100:5.0:6.3 |
| 1.5 | 270 | 300 | 1220/2330 | 85 | 100:5.6:7.7 |
| 1.6 | 270 | 300 | 912/1760 | 175 | 100:5.1:4.7 |

EXAMPLE 2

(A) A mixture containing 610 g of 1,1,2-trimethyltrimethoxydisilane, 390 g of 1,2-dimethyltetramethoxydisilane and 132 g of 1,1,2-trimethyl-1,2-dimethoxyphenyldisilane is warmed to 38° C., and 1.5 g of sodium methoxide are added, during which the temperature of the mixture rises to 95° C. The mixture is subsequently warmed to 150° C., during which time 727 g of a mixture of dimethyldimethoxysilane and methyltrimethoxysilane in a ratio of 20:80 distil off. The mixture is cooled to 75° C., and a pressure of 80 Pa is applied, causing an additional 43 g of the monosilane mixture described above to distil off. About 330 g of residue are obtained, which are dissolved in 400 g of petroleum ether having a boiling range of 170° to 200° C. in order to remove the undesired oligomers. The solvent and oligomers are subsequently removed by distillation at 230° C. and at 10 Pa. The 300 g of residue obtained is an organopolysilane having the average formula given in Example 1, the molar methyl group to methoxy group to phenyl group ratio being 100:5.7:7.0, the number average molecular weight $M_n$ to weight average molecular weight Mw ratio is 870:1850 and the softening point is 115° C.

(B) About 270 g of the resultant organopolysilane are dissolved in 300 g of xylene, then 50 g of tetra-n-butyl titanate (commercially available from Fluka Feinchemikalien GmbH, D-7910 Neu-Ulm) are added, and the mixture is stirred at 130° C. for one hour. The solvent is subsequently removed by distillation at 230° C. and 10 Pa. A grey-blue resin is obtained which softens at 120° C. and has a number average molecular weight Mn to weight average molecular weight Mw ratio of 800:2000. The molar methyl group to methoxy group to methoxy group to phenyl group ratio is 100:5.6:7.0.

(C) The procedure described in (B) above is repeated, except that 50 g of tetraisopropyl titanate (commercially available from Fluka Feinchemikalien GmbH, D-7910 Neu-Ulm) are substituted for the 50 g of tetra-n-butyl titanate. A grey-blue resin is obtained which softens at 120 C and has a number average molecular weight $M_n$ to weight average molecular weight $M_w$ ratio of 800:2000. The molar methyl group to methoxy group phenyl group ratio is 100:5.6:7.0.

COMPARISON EXAMPLE 1

The procedure described in Example 2(A) above is repeated, except that 100 g of phenylmethyldimethoxysilane are substituted for the 132 g of 1,1,2-trimethyl-1,2-dimethoxyphenyldisilane. An organopolysilane having a molar methyl group to methoxy group to phenyl group ratio of 100:4.6:3.6 is obtained.

EXAMPLE 3

(A) The procedure described in Example 2(A) above is repeated, except that the 100 g of 1,2-dimethyl-1,2-dimethoxydivinyldisilane are substituted for the 132 g of 1,1,2-trimethyl-1,2-dimethoxyphenyldisilane, and the maximum temperature during work-up (distillation) is 150° C. About 330 g of organopolysilane are obtained, in which the molar methyl group to methoxy group to vinyl group ratio is 100:5.7:1.3, the number average molecular weight $M_n$ to weight average molecular weight $M_w$ ratio is 830:1950, and the softening point is 105° C.

(B) The procedure described in Example 2(B) above is repeated using the organopolysilane prepared in (A) above, but with the maximum temperature during work-up (distillation) being 150° C. A grey-blue resin is obtained which softens at 125° C. and has a number average molecular weight $M_n$ to weight average molecular weight $M_w$ ratio of 850:2100. The molar methyl group to methoxy group to vinyl group ratio is 100:5.7:0.9.

EXAMPLE 4

(A) The procedure described in Example 2(A) above is repeated, except that a mixture containing 66 g of 1,1,2-trimethyl-1,2-dimethoxyphenyldisilane and 66 g of 1,2-dimethyl-1,2-dimethoxydivinyldisilane are substituted for the 132 g of 1,1,2-trimethyl-1,2-dimethoxyphenyldisilane, and the maximum temperature during work-up (distillation) being 150° C. About 330 g of organopolysilane are obtained, the molar methyl group to methoxy group to vinyl group to phenyl group ratio being 100:5.6:0.9:3.0, the number average molecular weight Mn ratio being 790:3500, and the softening point being 105° C.

(B) The procedure described in Example 2(B) is repeated using the organopolysilane prepared in (A) above, but with the maximum temperature during work-up (distillation) being 150° C. A grey-blue resin is obtained which softens at 120° C. and has a number average molecular weight $M_n$ to weight average molecular weight $M_w$ ratio of 800:4000. The molar methyl group to methoxy group to phenyl group to vinyl group ratio is 100:5.6:3.0:0.5.

EXAMPLE 5

In each case, 150 g of one of the resins prepared in Examples 1(B), 3(B), and 4(B) and in Example 2 under (A), (B) and (C) are heated to 1250° C. under an argon atmosphere at a heating rate of 20° C. per minute. After cooling to room temperature, black silicon carbide of the composition given in Tabel 3 is obtained.

TABLE 3

| Resin from Example | Residue[1] [%] | Si [%] | C [%] | H [%] | Ti [%] |
| --- | --- | --- | --- | --- | --- |
| 1(B)[2] | 44–48 | 52–61 | 29–32 | 0.6–0.4 | 2.1–2.5 |
| 2(A) | 41–45 | 52–58 | 28–31 | 0.6–0.4 | 0 |
| 2(B), (C) | 46–49 | 52–58 | 28–31 | 0.6–0.4 | 1.2–1.5 |
| 3(B) | 55–63 | 52–58 | 28–31 | 0.6–0.4 | 1.2–1.5 |
| 4(B) | 53–58 | 52–58 | 28–31 | 0.6–0.4 | 1.2–1.5 |

[1]based on the weight of resin employed
[2]experiments 1.1 to 1.6 under (B)

EXAMPLE 6

The organopolysilanes prepared in Examples 1(B), 2(B), 3(B) and 4(B) are in each case warmed in a spinneret to a temperature from 25° to 65° C. above the respective softening point, with the proviso that organopolysilanes containing vinyl groups are warmed to a maximum fo 150° C., and spun at from 10 to 100 bar in each case through a 100 μm perforated die and through a 300 μm perforated die, the take-off rate being varied in the range from 35 to 250 m/minute. On leaving the spinning die, the fibers are blue-grey and non-transparent and, depending on the spinning conditions chosen, have individual filament diameters in the range from 10 to 150 μm. The fibers are stored for from 3 to 20 days in light and air, during which time they become colorless and transparent. The fiber bundles obtained in this manner have good tear strength and flexibility. They are drawn continuously at a tension of from 0.5 to 2.0 g at a rate of 0.5 m/minute through an argon-flushed tubular furnace at 1250° C. with a 0.25 m heating zone.

The resultant SiC fibers have an average composition of:
- silicon: from 45 to 54 percent by weight
- carbon: from 23 to 28 percent by weight
- oxygen: from 15 to 25 percent by weight
- titanium: from 0 to 2.5 percent by weight
- hydrogen: <0.5 percent by weight.

The tensile strength of the resultant SiC fibers is, depending on their diameter.
- 0.45–0.6 GPa at 100 μm,
- 0.6–0.8 GPa at 50 μm,
- 0.7–1.1 GPa at 30 μm and
- 2.5–3.2 GPa at 10 μm The specific electrical resistance is $10^3$ Ω·cm.

The tensile strength values are retained for at least one hour at temperatures up to about 1200° C. in air and up to about 1300° C. under an inert atmosphere.

What is claimed is:

1. A process for preparing organopolysilanes which consists of reacting at least one disilane of the general formula $$R_k R^3{}_m Si_2(OR^1)_{6-k-m} \quad (I)$$

in which R is selected from the group consisting of hydrogen atoms and monovalent saturated organic radicals, $R^3$ is a monovalent unsaturated organic radical, $R^1$ is an alkyl radical, k is 0, 1, 2 or 3, and m is 1, 2, 3 or 4, in which the sum of k and m is less than or equal to 4, and optionally mixed with a disilane of the formula $$R_n Si_2(OR^1)_{6-n} \quad (II)$$

in which R and $R^1$ are the same as above and n is 0, 1, 2 or 3, in the presence of at least one compound of the general formula $$MOR^2 \quad (III)$$

in which $R^2$ is a monovalent hydrocarbon radical and M is an alkali metal atom.

2. The process of claim 1, in which the reaction is conducted in the presence of the disilane of formula (II).

3. The process of claim 2, wherein the disilane of the formula (II) is a mixture of a disilane of the formula $$R_3 Si_2(OR^1)_3 \quad (IV)$$

and a disilane of the formula $$R_2 Si_2(OR^1)_4 \quad (V)$$

in which R is selected from the group consisting of hydrogen atoms and monovalent saturated organic radicals and $R^1$ is an alkyl radical.

4. The process of claim 3, wherein the molar ratio of the disilane of formula (IV) and the disilane of formula (V) in the mixture is between 30:70 and 90:10.

5. The process of claim 1, wherein the disilane of formula (II) is employed in an amount of from 100 to 3000 percent by weight, based on the weight of the disilane of formula (I).

6. The process of claim 1, wherein the compound of formula (III) is employed in an amount of from 0.03 to 2.50 percent by weight, based on the total weight of the disilane.

7. A composition which is obtained in accordance with the process of claim 1.

8. A composition prepared in accordance with the process of claim 1 which also includes a compound of the formula $$R^5 O((R^5 O)_2 TiO)_p Ti(OR^5)_3$$

in which $R^5$ is an alkyl radical, and p is an integer of from 0 to 1000.

* * * * *